United States Patent
Vemula (10) Patent No.: US 7,596,707 B1
(45) Date of Patent: Sep. 29, 2009

(54) SYSTEM AND METHOD FOR EFFICIENT POWER THROTTLING IN MULTIPROCESSOR CHIP

(75) Inventor: Sunil K. Vemula, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 393 days.

(21) Appl. No.: 11/123,760

(22) Filed: May 6, 2005

(51) Int. Cl.
*G06F 1/26* (2006.01)
*G06F 1/32* (2006.01)

(52) U.S. Cl. .................. 713/320; 713/300; 711/105; 711/167

(58) Field of Classification Search ............... 711/105, 711/167; 713/300, 320
See application file for complete search history.

(56) References Cited

U.S. PATENT DOCUMENTS

| | | | | |
|---|---|---|---|---|
| 5,432,918 A * | 7/1995 | Stamm | ........................ | 711/156 |
| 6,173,217 B1 * | 1/2001 | Bogin et al. | ................. | 700/299 |
| 6,266,735 B1 * | 7/2001 | Isobe | ............................ | 711/5 |
| 6,408,371 B1 * | 6/2002 | Jeddeloh | ..................... | 711/170 |
| 6,453,370 B1 * | 9/2002 | Stracovsky et al. | ........... | 710/36 |
| 6,470,238 B1 * | 10/2002 | Nizar et al. | .................. | 700/299 |
| 6,507,530 B1 * | 1/2003 | Williams et al. | ............ | 365/226 |
| 6,539,440 B1 * | 3/2003 | Stracovsky et al. | ........... | 710/58 |
| 6,662,278 B1 * | 12/2003 | Kahn et al. | .................. | 711/154 |
| 6,772,352 B1 * | 8/2004 | Williams et al. | ............. | 713/300 |
| 6,944,730 B2 * | 9/2005 | Lai et al. | ..................... | 711/158 |
| 7,106,696 B1 * | 9/2006 | Lim et al. | ................. | 370/230.1 |
| 7,159,082 B1 * | 1/2007 | Wade | ......................... | 711/155 |
| 7,191,088 B1 * | 3/2007 | Reed et al. | ................... | 702/130 |
| 7,269,481 B2 * | 9/2007 | De Lorenzo et al. | ........ | 700/299 |
| 7,299,313 B2 * | 11/2007 | Gower et al. | ................ | 711/100 |
| 7,340,618 B2 * | 3/2008 | Kark et al. | .................. | 713/300 |
| 2004/0230739 A1 * | 11/2004 | Tsern et al. | .................. | 711/105 |
| 2004/0267409 A1 * | 12/2004 | De Lorenzo et al. | ........ | 700/299 |
| 2005/0289292 A1 * | 12/2005 | Morrow et al. | .............. | 711/105 |
| 2006/0095646 A1 * | 5/2006 | Gower et al. | ................ | 711/100 |
| 2006/0206738 A1 * | 9/2006 | Jeddeloh et al. | ............. | 713/320 |

\* cited by examiner

*Primary Examiner*—Thomas Lee
*Assistant Examiner*—Jaweed A Abbaszadeh
(74) *Attorney, Agent, or Firm*—Martine Penilla & Gencarella, LLP (57) ABSTRACT

A method for limiting power consumption in a multiprocessor chip is provided. In this method, a read or write request is received by the memory controller, which controls a memory that is external to the multiprocessor chip. The memory controller includes a bank counter that keeps track of the number of read or write requests received by the memory controller. At every clock cycle, the bank counter value is compared with a threshold value to determine whether the counter value is equal to the threshold value. If the bank counter value is determined to be equal to the threshold value, then any subsequent incoming read or write requests are blocked. The bank counter value is incremented each time a read or write request is sent to the memory.

19 Claims, 5 Drawing Sheets

SYSTEM AND METHOD FOR EFFICIENT POWER THROTTLING IN MULTIPROCESSOR CHIP

BACKGROUND

Description of the Related Art

As the semiconductor process technology advances, there is a constant drive to reduce the size of the devices while increasing the functionality of the device. As the technology has progressed to multiple processors placed on a single chip, additional obstacles must be overcome. Attached directly to these multiprocessor chips is large amounts of memory, which consume a lot of power. This large power consumption may lead to overheating of the multiprocessor chip, the attached memory, and the system that includes the multiprocessor chip and the attached memory. If the power consumption goes unchecked it can lead to system failures. Designing multiprocessor chips and memory, which are capable of withstanding high temperatures is costly. As a result, there is a need for a system that can effectively manage the power consumption of the multiprocessor chip, the memory that is attached to the multiprocessor chip, and the system in which they are placed, in order to prevent the excessive heat dissipation.

SUMMARY

Broadly speaking, the present invention fills these needs by providing a system and method for limiting power consumption in a multiprocessor chip and the memory attached to the multiprocessor chip. It should be appreciated that the present invention can be implemented in numerous ways, including as a method, a system, or a device. Several inventive embodiments of the present invention are described below.

In accordance with a first aspect of the present invention, a method for limiting power consumption in a memory attached to a multiprocessor chip is provided. The method includes receiving a read or write request from a processor. The read or write request is received by the memory controller, which controls a memory that is external to the chip. The memory controller includes a counter that keeps track of the number of read or write requests received by the memory controller. The counter value is then compared with a threshold value to determine whether the counter value is equal to the threshold value. If the counter value is determined to be equal to the threshold value, then any subsequent incoming read or write requests are blocked for a predetermined time period.

In accordance with a second aspect of the present invention, a method for limiting power consumption in a memory attached to a multiprocessor chip having integrated memory controllers is provided. The method includes assigning a maximum bank counter value to a bank counter. The maximum bank counter value represents the maximum number of read or write requests that can be accommodated during a set time interval. The method further includes receiving a read or write request by one of the memory controllers. In response to receiving the read or write request, a determination is made as to whether the bank counter value is less than the maximum bank counter value. If the bank counter value is determined to be less than the maximum bank counter value, then the bank counter value is incremented, and the read or write request is sent to the memory. Once the incremented bank counter value equals the maximum bank counter value, then the method includes blocking all the subsequent read or write requests to/from the memory so that the number of read or write requests carried out within a given time interval is limited to the maximum bank counter value.

In accordance with a third aspect of the invention, a system for limiting power consumption in a memory attached to a multiprocessor chip is provided. The system includes a plurality of processor cores. The system further includes a memory controller. The memory controller acts as an interface between the multiprocessor chip and the memory. The memory controller includes bank counter logic, which keeps track of the number of read or write requests that are received by the memory controller. The bank counter logic increments the bank counter value each time a read or write request is received sent to the memory. The memory controller further includes throttling logic that blocks any read or write requests received subsequent to the bank counter reaching a threshold value.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for a system and method for limiting power consumption in a multiprocessor chip. It will be obvious, however, to one skilled in the art, that the present invention may be practiced without some or all of these specific details. In other instances, well known process operations have not been described in detail in order not to unnecessarily obscure the present invention.

The embodiments described herein provide a system and method for limiting power consumption in a multiprocessor chip. The power consumption in a multiprocessor chip is limited by controlling the reads and writes across different channels without hampering the performance of any given channel. In order to reduce power consumption, the maximum number of open banks across multiple channels is set to a maximum limit for a given interval of time. When the number of open banks reaches the maximum limit, the read or write or write operation to and from the memory is blocked for the set time interval. The read or write operation only resumes after the set time interval expires.

Figure 1:
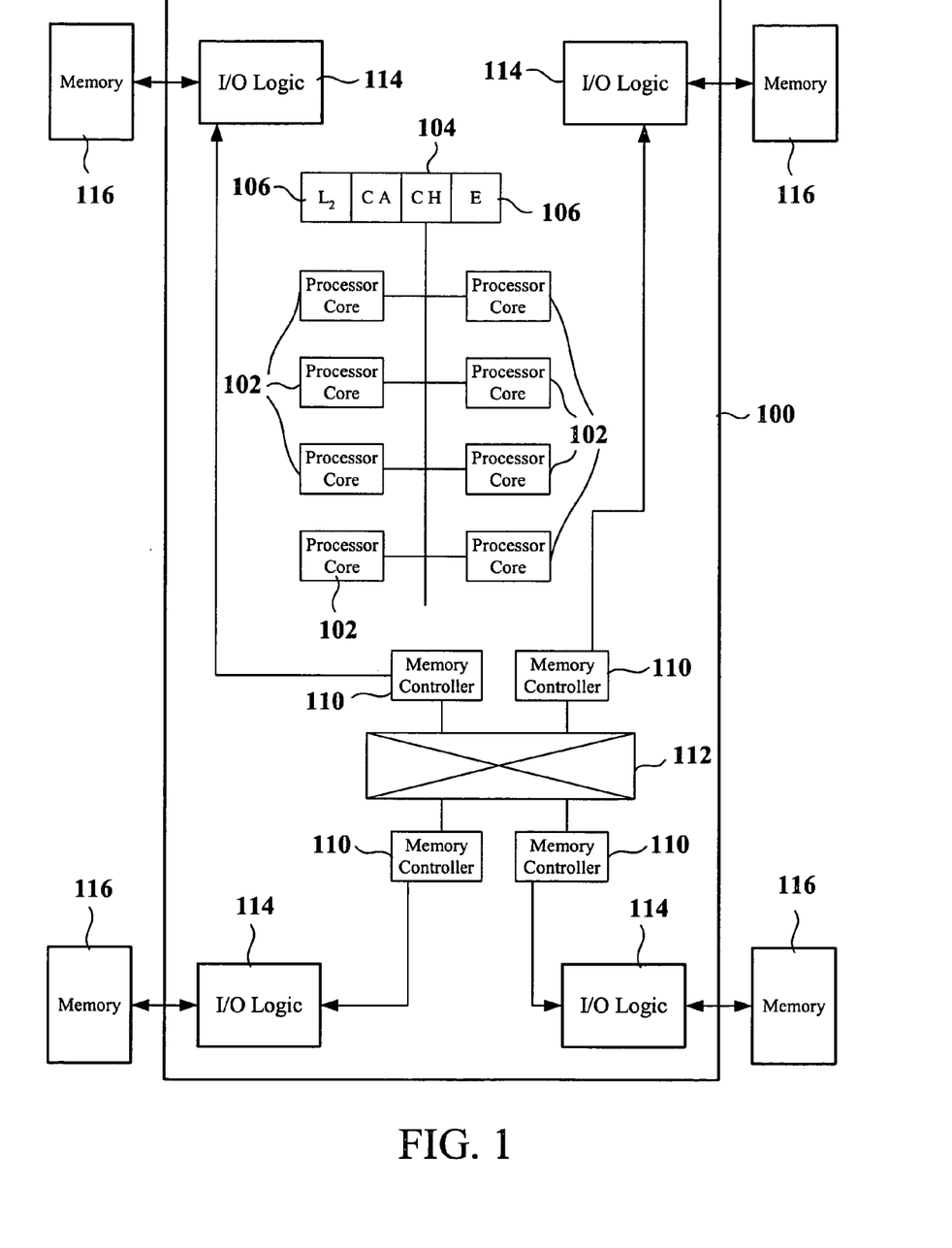
FIG. 1 is a high level overview of a multiprocessor chip in accordance with an embodiment of the present invention.

FIG. 1 shows a multiprocessor chip 100 in accordance with an embodiment of the present invention. The multiprocessor chip 100 is shown to include 8 processor cores 102. Processor cores 102 are the central portion of the chip 100. The multiprocessor chip 100 is further shown to include L2 cache 104. The L2 cache 104 is divided into banks 106. The processor cores 102 and the L2 cache 104 are in communication with each other via bus 108. As is well known, the cache holds recently accessed data so that, when the same data are accessed at a later stage, the data are returned immediately. If the data are not available in the cache, then a "cache miss" occurs and the data are fetched from the main memory and are written to the L2 cache 104. Similarly, when the cache gets full, the data which are infrequently used are written to the memory in order to free up space in the cache.

Still referring to FIG. 1, the multiprocessor chip 100 includes memory controllers 110. The memory controllers 110 are connected to each other through a cross bar bus 112. The memory controllers 110 provide the control and interface for memory 116. The memory controllers 110 are also connected (not shown) to the L2 caches 104 so that when a cache miss occurs at the L2 cache 104 for a read or write request, the read or write request is transferred to one of the memory controllers 110. The memory controllers 110 then make the request to the memory 116 and the data are fetched from the memory 116. In one embodiment, the memory 116 is a dual-in-line memory module (DIMMs). DIMMs are provided with dynamic RAM (DRAM) chips and are capable of handling 128-bit data paths. In this embodiment, the memory controllers 110, which control the DIMMs, are DRAM memory controllers. As the memory controllers 110 are located on the multiprocessor chip 100, whenever there is a cache miss, the read operation has to proceed to the memory 116 through the memory controllers 110, causing a lot of activity to take place in the memory and on the multiprocessor chip 100 leading to heat generation.

Likewise, when the cache is full, the data, which are infrequently used are written to the memory in order to free up space in the cache. Also, when there is a cache miss during a read operation, the requested data are fetched from the main memory and saved in the cache under the assumption that the written data are likely to be read back again at some point in the near future. The write operations for updating the cache, and freeing cache can also increase power consumption, which results in heat accumulation on the multiprocessor chip and the memory.

As shown, the multiprocessor chip 100 includes 8 processor cores 102. Each of the processor cores 102 shares the 4 banks 106 of the L2 cache 104. In one embodiment, each of the processor cores 102 has 4 threads, i.e. one thread for each of the 4 banks of the L2 cache 104 resulting in a total of 32 threads. Thus, up to 32 independent threads can be operating on the multiprocessor chip 102 at any given time. One skilled in the art will understand that the number of processor cores 102 shown on the multiprocessor chip 100 is arbitrary. It should be understood that the present invention can be implemented in any multiprocessor chip having any number of processor cores being interconnected in any manner. Similarly, the number of banks 106 for L2 caches 104 is also arbitrary and this too can vary depending on the application. In one embodiment, L2 cache 104 is made of high speed Static Random Access Memory (SRAM).

In FIG. 1, memory controllers 110 are shown to be in communication with input/output (I/O) logic 114. The I/O logic 114 is capable of generating the drivers that actually drive the memory 116. One skilled in the art should understand that the chip 100 may include other elements which are not shown in FIG. 1. For example, FIG. 1 does not show an L1 cache but the processor cores are generally in communication with an L1 cache and the processors are likely to make a request to the L1 cache prior to making a request to an L2 cache.

Figure 2:
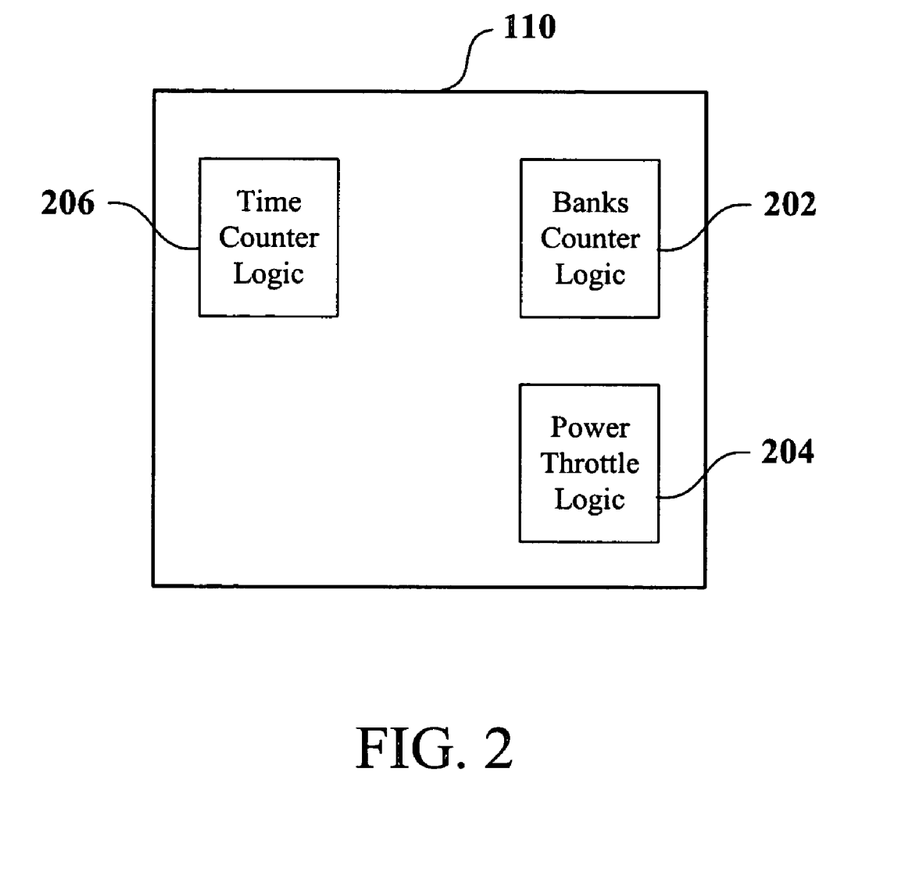
FIG. 2 is a more detailed block diagram of one of the memory controllers shown in FIG. 1 in accordance with an embodiment of the present invention.

FIG. 2 is a more detailed block diagram of one of the memory controllers 110 shown in FIG. 1, in accordance with an embodiment of the present invention. The memory controller 110 is shown to include a time counter logic 206. The time counter logic 206 is configured to count up every clock cycle. According to the embodiments of the present invention, the number of read or write requests processed by the memory controller within a set time interval is set to a maximum limit and any read or write request that comes in after the number of read or write requests reaches the maximum limit is blocked from being sent to the memory, until the set time interval expires. In one embodiment, the maximum limit can be programmed into the chip and it can be changed according to the need. Likewise, the set time interval within the time counter logic 206 is programmed and this too may be changed depending on the functionality. The maximum limit and the set time interval may be programmed in hardware or software. As such, the embodiments described herein provide a flexible way of preventing overheating of multiprocessor chips.

Still referring to FIG. 2, the memory controller 110 is further shown to include banks counter logic 202 to keep track of the number of banks open during the set time interval. The maximum number of banks that can be opened during the set time interval is fixed so that the number of read or write operations that are carried out during the set time interval will not exceed the fixed value. When the number of read or write requests equals the fixed value, the power throttle logic 204 prevents additional read or write requests from being carried out.

Figure 3:
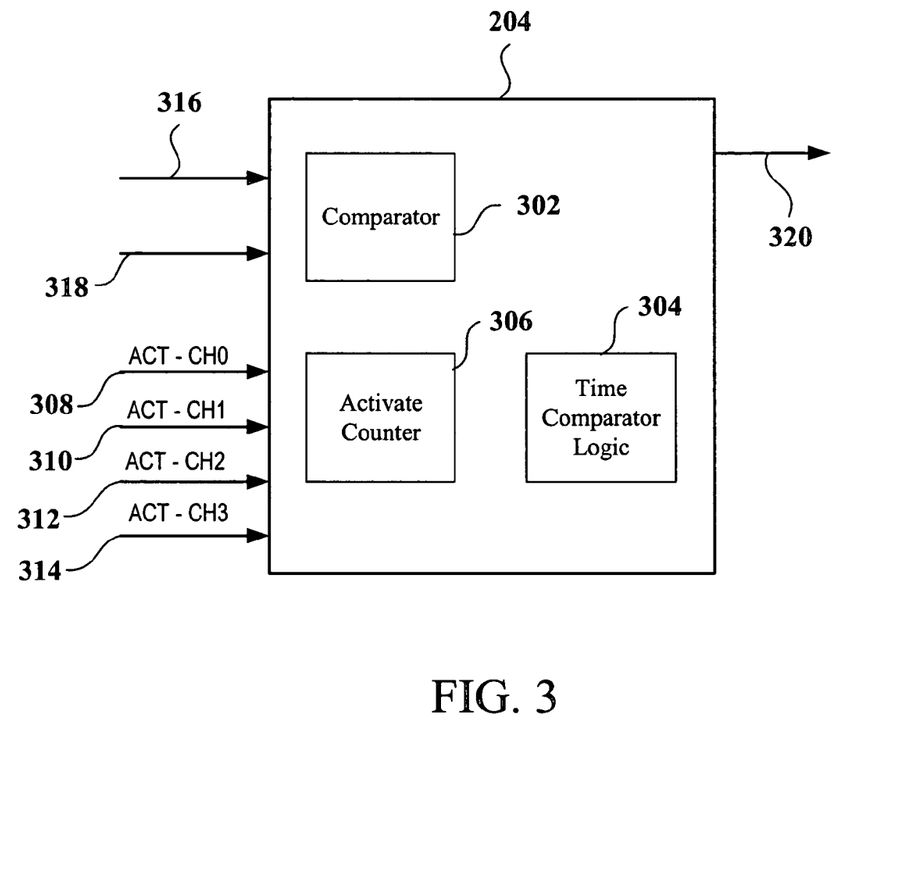
FIG. 3 is a more detailed block diagram of the power throttle logic shown in FIG. 2 that controls the number of read or write operations that take place on a multiprocessor chip in accordance with one embodiment of the present invention.

FIG. 3 is a more detailed block diagram of the power throttle logic 204 shown in FIG. 2. The power throttle logic 204 is shown to include bank open or bank activate requests 308, 310, 312, and 314 arriving from channel 0, channel 1, channel 2, and channel 3, respectively. The power throttle logic 204 is provided with the set time interval 318 and the maximum number of bank activations 316 for the duration of the set time interval 318. The power throttle logic 204 is further shown to include an activate counter 306. The read and write commands generally include an activate command and the actual read or write command. The activate commands cause the activation of the banks. The activate counter 306 keeps track of the sum total of the activate commands received from each of the channels 308, 310, 312, and 314. Each time an activate command is received through any one of the channels 308, 310, 312 and 314, the value stored in the activate counter 306 is incremented. The sum total of the activate commands shows the total number of banks that are kept open at any time by all the memory controllers 110 on the multiprocessor chip 100 of FIG. 1.

The comparator 302 compares the value stored in the activate counter 306 with the value representing the maximum number of the bank activations 316. When the comparator 302 determines that the value stored in the total activate counter is equal to the value representing the maximum number of bank activations 316, then the power throttle logic 204 prevents any more banks from being activated until the set time interval 318 expires by throttling 320. Similarly, the current value of the time counter logic 206 in FIG. 2 is compared to the set time interval 318 in time comparator logic 304. If the current value of the time counter logic 206 is greater than or equal to the set time interval 318, then the activate counter 306, the banks counter logic 202 of FIG. 2, and the time counter logic 206 of FIG. 2 are all reset.

In one embodiment, each time an activate counter 306 is incremented, a signal is sent out to the activate counter of the power throttle logic located in all memory controllers 110 on the chip 100, to increment the corresponding total activate counters. This enables all the activate counters 306 in all the memory controllers 110 of FIG. 1 to be synchronized and allows each one of the activate counters in memory controllers 110 to have a running tally of the number of banks open on the multiprocessor chip 100 at any given time. This way, the maximum number of banks that may be activated at any given time on the multiprocessor chip 100 is controlled by a universal value so that the throughput is not interrupted even if all the read or write operations take place through a single channel.

Figure 4:
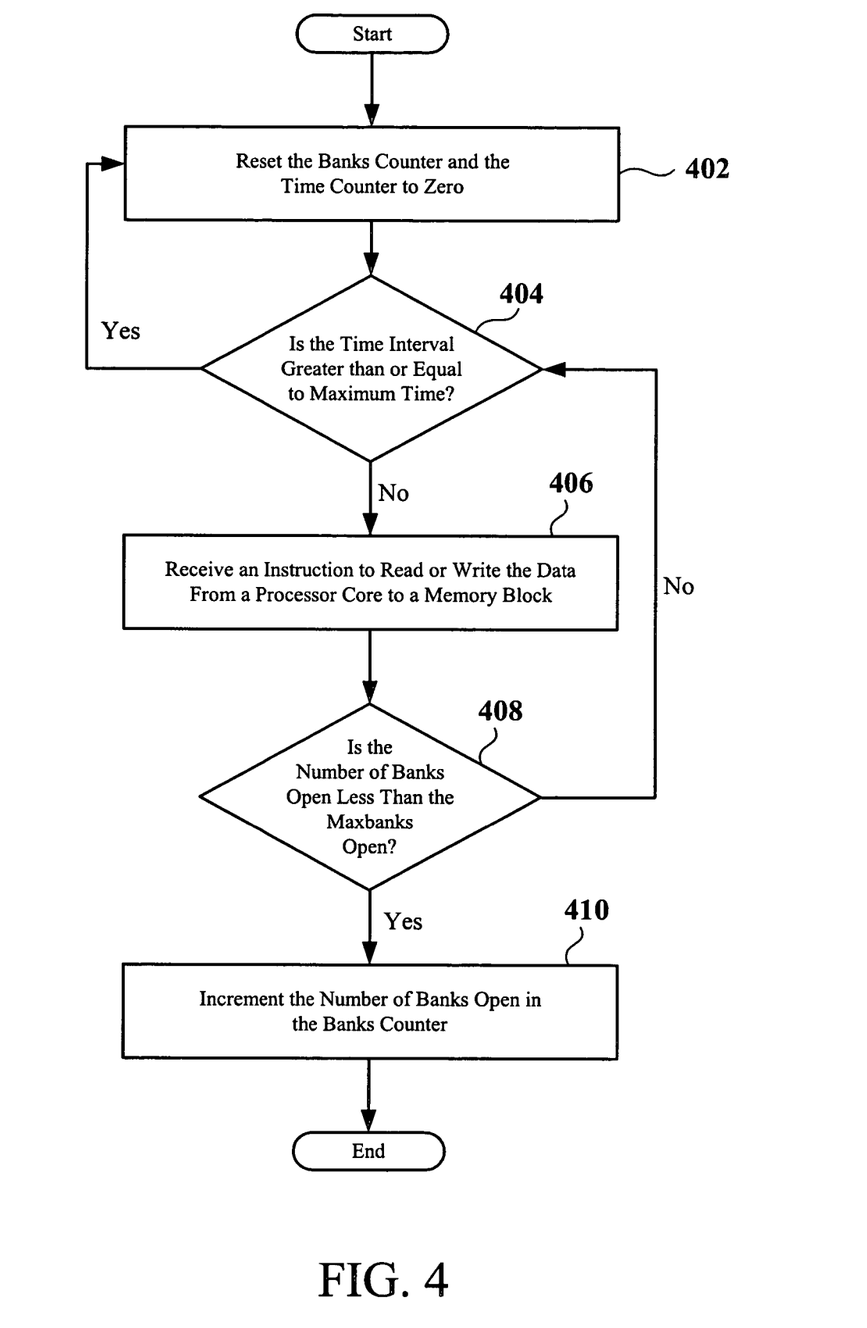
FIG. 4 is a flowchart illustrating the method of operations for limiting power consumption in a memory attached to a multiprocessor chip in accordance with an embodiment of the present invention.

FIG. 4 is a flowchart illustrating the method of operations for limiting power consumption in a multiprocessor chip and the memory attached to the multiprocessor chip, in accordance with an embodiment of the present invention. Starting in operation 402, the banks counter and the time counter are reset to zero. Next in operation 404, a determination is made as to whether time interval is greater than or equal to maximum time. As described above, maximum time is the duration for which the number of read and write operations are measured. If the time interval is greater than maximum time then the operation reverts back to operation 402 where the banks counter and the time counter are reset so that the process can start over again. Else, as described above, the method proceeds to operation 406. In operation 406, the memory controller continues to receive instructions from the processor to read or write data from/to the memory. The memory controller receives/sends data from/to the memory in response to those instructions.

Subsequently in operation 408, a determination is made to see whether the number of open banks is less than or equal the maximum allowable number of open banks. If the number of open banks is less than or equal to the maximum allowable number of open banks, then the operation proceeds to increment the number of banks open in the banks counter as shown in operation 410. Alternatively, if it is determined that the number of banks open is greater than the maximum number of allowable number of open banks, then the method reverts back to operation 404 described above. Thus, when the number of banks open is greater than or equal to the maximum allowable number of banks open and the current time is less than the set time interval, then any new read or write operations to and from the memory is blocked from being carried out until the set time interval expires. Accordingly, as described above, the number of read or write operations that may take place on the multiprocessor chip and the attached memory during the maximum time is controlled.

As can be seen, the power consumption in the multiprocessor chip and the attached memory is limited by limiting the number of read and write operations that may take place in a set time interval. The number of read or write operations that takes place within the set time interval is limited by setting a limit on the number of open banks. Once the number of open banks reaches the set limit, any subsequent incoming read or write requests are throttled. As described herein, throttling means preventing the read or write operation from proceeding to and from the memory. The read and write operations will resume once the time interval is equal to the set time interval. When the time interval is equal to the set time interval, the number of open banks is reset so that, when a new read or write request comes in, the counter restarts from the beginning. In one embodiment, when a read or write request arrives at the memory controller subsequent to the number of open banks reaching the maximum allowable number of open banks, the incoming read or write requests are buffered until the set time interval expires. When the set time interval expires, the read or write requests are resumed beginning with the read or write requests stored in the buffer.

As discussed above, the read or write request generally involves two commands. The first one involves an activation command and the second one involves the actual read or write operation command. In response to the activate command, the banks counter is incremented in the memory controller as indicated in operation 410. The banks counter within the memory controller is configured to keep track of the number of open banks within itself as well as the number of open banks in the other memory controllers within the multiprocessor chip.

Figure 5:
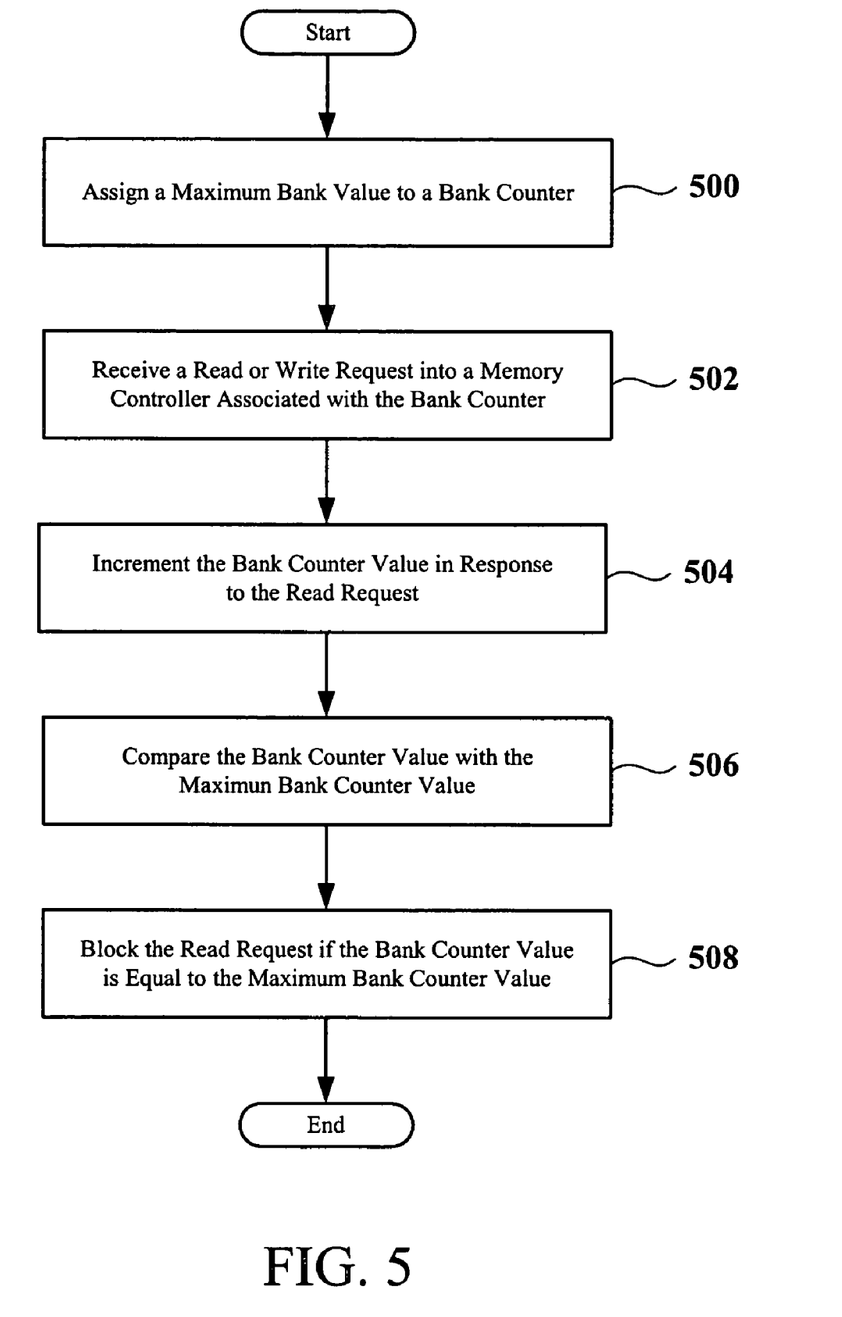
FIG. 5 is a flowchart illustrating the method of operations for limiting power consumption in a memory attached to a multiprocessor chip in accordance with another embodiment of the present invention.

FIG. 5 is a flowchart illustrating the method of operations for limiting power consumption in a multiprocessor chip, in accordance with an embodiment of the present invention. Starting at operation 500, a maximum bank counter value is assigned to a bank counter. In one embodiment, each of the memory controllers on the multiprocessor chip is assigned a separate individual maximum bank counter value. The individual maximum bank counter value for each of the memory controllers can be equal or different. Next in operation 502, a read or write request into a memory controller associated with the bank counter is received. As explained above, when there is a cache miss, the data are retrieved from the memory. Thereafter, in operation 504, a value stored in the bank counter is incremented in response to the read or write request. The bank counter is configured to keep track of the total number of read or write requests received by the memory controller housing the bank counter. Then, the value stored by the bank counter is compared with the maximum bank counter value for that controller in operation 506.

The maximum bank counter value for each controller is set so that the number of read or write operations that can take place in a set time through any memory controller can be controlled. When compared, if the value stored by any one of the bank counters in any of the memory controllers is equal to the maximum bank counter value, for that controller, then any read or write or write request that comes in subsequently is blocked as indicated in operation 508. As explained above, the read or write or write requests are blocked only for the duration of the set time interval. When the set time interval expires, the read or write or write request resumes for the next set time interval and so on.

As previously described in detail above, the read or write operations are throttled when the value stored in the bank counter reaches a maximum bank counter value. As both the read and write operations include the activate command and the actual read or write command, by tracking the activate command, the number of read or write operations that may take place during a set interval can be controlled.

In summary, the above described invention provides a system and method for limiting power consumption in a multiprocessor chip and the memory attached to the multiprocessor chip. In order to conserve power consumption, the number of read and write operations that may be carried out in a set time interval is limited to a certain maximum value. When the number of read and write operations equals the maximum value, any new read or write operation is blocked from being carried out. This allows the chip to stay idle intermittently thus reducing the power consumption in the multiprocessor chip and the memory attached to the multiprocessor chip. Lower power consumption in turn prevents the multiprocessor chip as well as the memory attached to the multiprocessor chip from getting overheated. The methods described herein helps to control power across multiple channels by using a single programmable value. As can be seen, the method also provides non-biased throughput for all channels based on the activity of channels rather than a fixed count per channel. This invention will be particularly useful for any systems that handle a lot of traffic, such as a web server, application server, etc. Moreover, the multiprocessor chip of FIG. 1 may be incorporated into any suitable computing device. Exemplary computing devices include servers, desktop computers, personal digital assistants, workstations, supercomputers, etc.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as, producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A system for limiting power consumption in a memory attached to a multiprocessor chip comprising:
   a multiprocessor chip;
   a plurality of memory controllers inside the multiprocessor chip in communication with a memory, wherein each memory controller includes,
      a bank counter logic configured to increment a local bank counter in response to a read or write request, the local bank counter indicating how many memory banks are open in the memory by the each memory controller;
      total bank counter logic configured to increment a total bank counter value, the total bank counter value indicating a total number of banks open by all the memory controllers;
      a time counter logic configured to keep track of time in increments of a set time interval; and
      a throttling logic configured to block the read or write request received subsequent to the total bank counter logic reaching a threshold value, the blocking the read or write request including temporarily storing the read or write request, and when terminating the blocking, resuming the read or write requests beginning with the at least one temporarily stored read or write requests;
   wherein a signal is sent to the memory controllers to increment the total bank counter values each time a bank is open by any of the memory controllers.

2. A system of claim 1 further comprising:
   a reset logic configured to reset the total bank counter value and the local bank counter when the time is equal to or greater than the set time interval.

3. A system of claim 2, wherein the plurality of processors are multithreaded processors.

4. A system of claim 1, wherein the memory is a dual-in-line memory module (DIMM).

5. A system of claim 1, further comprising:
   input/output logic through which the memory controller communicates with the memory.

6. A system of claim 5, wherein the input/output logic is configured to generate drivers that drive the memory.

7. A method for limiting power consumption in a multiprocessor chip having integrated memory controllers, the method comprising:
   receiving a read or write request at a particular memory controller, wherein each memory controller has a local bank counter indicating how many memory banks are open in the memory by the each memory controller;
   incrementing the local bank counter at the particular memory controller;
   incrementing a total bank counter value at each memory controller, the total bank counter value indicating a total number of banks open by all the memory controllers; and
   blocking the read or write request received by the particular memory controller subsequent to the total bank counter logic reaching a threshold value, the blocking the read or write request including temporarily storing the read or write request, and when terminating the blocking, resuming the read or write requests beginning with the at least one temporarily stored read or write requests;
   wherein a signal is sent to the plurality of memory controllers to increment the total bank counter values each time a bank is open by any of the memory controllers.

8. A method of claim 7, further comprising:
   resetting a time counter.

9. A method of claim 8, further comprising:
   determining if a current value of the time counter is equal to or greater than a predetermined time interval, and if the current value of the time counter is determined to be equal to or greater than the time interval, the method including,
      resetting the total bank counters and the local bank counters; and
      resetting the time counter.

10. A method of claim 9, wherein blocking the read or write request includes,
    discontinuing issuing activation commands until resetting the time counter.

11. A method of claim 10, wherein the blocking the read or write request terminates after resetting the time counter.

12. A method of claim 7, further comprising:
    determining whether a set time interval has expired.

13. A method of claim 12, wherein the set time interval is determined to have expired, then the method includes, resetting the total bank counter value and the local bank counter.

14. A method of claim 13, wherein the blocking the read or write request terminates after resetting the total bank counter value.

15. A computer program embedded in a tangible computer-readable storage medium, when executed by one or more processors, for limiting power consumption in a multiprocessor chip having integrated memory controllers, the computer program comprising:

program instructions for receiving a read or write request at a particular memory controller, wherein each memory controller has a local bank counter indicating how many memory banks are open in the memory by the each memory controller;

program instructions for incrementing the local bank counter at the particular memory controller;

program instructions for incrementing a total bank counter value at each memory controller, the total bank counter value indicating a total number of banks open by all the memory controllers; and program instructions for blocking the read or write request received by the particular memory controller subsequent to the total bank counter logic reaching a threshold value, the blocking the read or write request including temporarily storing the read or write request, and when terminating the blocking, resuming the read or write requests beginning with the at least one temporarily stored read or write requests;

wherein a signal is sent to the plurality of memory controllers to increment the total bank counter values each time a bank is open by any of the memory controllers.

16. The computer program embedded in a computer-readable storage medium of claim 15, further comprising:

program instructions for resetting a time counter.

17. The computer program embedded in a computer-readable storage medium of claim 16, further comprising:

program instructions for determining if a current value of the time counter is equal to or greater than a predetermined time interval, and if the current value of the time counter is determined to be equal to or greater than the time interval, the program instructions including, program instructions for resetting the total bank counters and the local bank counters; and program instructions for resetting the time counter.

18. The computer program embedded in a computer-readable storage medium of claim 17, wherein the program instructions for blocking the read or write request include, program instructions for discontinuing issuing activation commands until resetting the time counter.

19. The computer program embedded in a computer-readable storage medium of claim 18, wherein the blocking the read or write request terminates after resetting the time counter.

* * * * *